R. C. WHITEHOUSE.
Frying Pan.
No. 75,095.
Patented March 3, 1868.
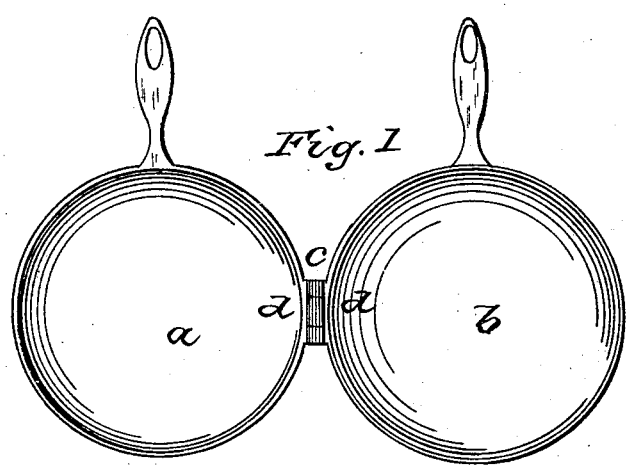
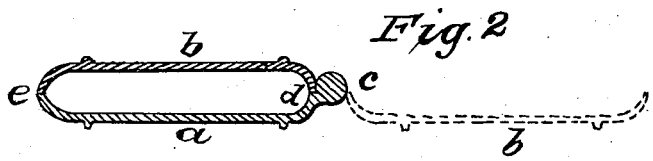
WITNESSES
Henry C. Houston
Wm Frank S Leavey
INVENTOR
R. C. Whitehouse
Per atty WH Clifford

United States Patent Office.

RALPH C. WHITEHOUSE, OF BOOTHBAY, MAINE.

Letters Patent No. 75,095, dated March 3, 1868.

IMPROVEMENT IN FRYING-PANS.

*The Schedule referred to in these Letters Patent and making part of the same.*

TO ALL WHOM IT MAY CONCERN:

Be it known that I, RALPH C. WHITEHOUSE, of Boothbay, in the county of Lincoln, and State of Maine, have invented a new and useful Improved Frying-Pan; and I hereby declare the following to be a full, clear, and exact description thereof, which will enable others to make and use my invention, reference being had to the accompanying drawings, forming part of this specification, in which—

Figure 1 is a front view of my invention, showing the interior surfaces of the two fry-pans, and the manner in which the pans are connected.

Figure 2 is a sectional elevation, showing both the position of the pans when closed upon each other, and also, in dotted lines, the upper pan when opened or turned back from the other.

The object of my invention is to procure greater ease and rapidity in the process of frying fritters, &c., and to obviate the various objections to which the method now pursued to accomplish this result is open. It is well known that the labor of frying "fritters," so-called, or other articles of food of a like nature, is considerable, owing to the fact that with the ordinary fry-pan, as at present constructed, but a single fritter or other like article can be cooked at a time, and in preparing food of this description for the consumption of a number of persons, as at a boarding-house, &c., some time is required to cook a sufficient quantity. It is also of some importance that the fritters first cooked should not become cool while others are undergoing the same process, as it is desirable that they should be eaten while still quite warm, or they will become tough, and in some degree indigestible. Where large quantities are to be prepared, extra precaution is required to avoid this, with the old form of pan and method of cooking.

My invention, which I will now proceed to describe in detail, with the manner of its operation, is intended to prevent this liability to cool in some measure.

I construct my invention as follows: Let $a$ and $b$ represent frying-pans of the ordinary form, but connected with each other by a hinge, $c$, at $d$, so as to admit of their being freely turned on and off each other. When turned one upon the other, the only point of contact of the pans is around the external edge or rim, as at $e$, fig. 2.

The operation of my invention is as follows: The pans are placed upon the stove or other cooking-apparatus open, and a sufficient quantity of batter to form one fritter is placed in one of them, for example, in $a$, while $b$ is left empty, and allowed to become heated by the action of the fire. The batter is allowed to cook brown upon the under side, or that next the bottom of the pan in which it has been placed, which is done in a short time. Meanwhile, another sufficient quantity of batter has been taken from the receptacle therefor, and as soon as the fritter in $a$ is browned, it is transferred to $b$, by gently turning over the pans so as to bring $b$ underneath, and by this means the other side of the fritter is exposed to the operation of the heat. Then the pans are opened, and the material for the second fritter placed in $a$, where it is allowed to become brown on one side as in the case of the preceding one. By the time this is accomplished the fritter in $b$ is cooked sufficiently, and is then removed to the dish prepared for its reception, and the fritter in $a$ is made to take its place by inverting the pans, as before described, and then another quantity of batter is again placed in $a$ to undergo the same process. By this method of cooking one side in $a$, then transferring to $b$, by which transfer the other or uncooked side is exposed to the direct action of the heat, it is evident that fritters, &c., can be cooked much more rapidly and conveniently than in the old way, as two are kept cooking at the same time. About half the time necessary to cook a given number of cakes by a single pan is required in my method.

I do not claim an egg-cooker, as set forth in the patent of W. Loucks, No. 48,190, June 13, 1865, viz, two plates of metal made to fold together, to revolve like a gridiron, and each having cup-shaped recesses to receive the eggs. Neither do I claim the griddle of Edwin A. Jeffrey, Patent No. 68,202, August 27, 1867, to wit, the combination of a rim, a fixed plate, and a hinged plate, the latter having certain recesses therein. My invention, different from these, consists of two frying-pans, each having a handle, and also united by a hinge, the hinge being placed on a side of the circle at the extremity of a diameter at right angles to one drawn through the circle in the same direction as the handles, the two handles, when the pans are closed, being together, one above the other, and when the pans are to be opened, acting as levers to open the same. By this means I secure the peculiar operation I have before described.

What I claim as my invention, and desire to secure by Letters Patent, is—

The combination and arrangement of the two pans $a$ $b$, united by the hinge $c$, and having the handles arranged as herein set forth, for the purposes described.

RALPH C. WHITEHOUSE.

Witnesses:
WM. H. CLIFFORD,
HENRY C. HOUSTON.